R. A. GIPPLE.
WATER WHEEL.
APPLICATION FILED SEPT. 14, 1918.
1,316,440.
Patented Sept. 16, 1919.
2 SHEETS—SHEET 1.
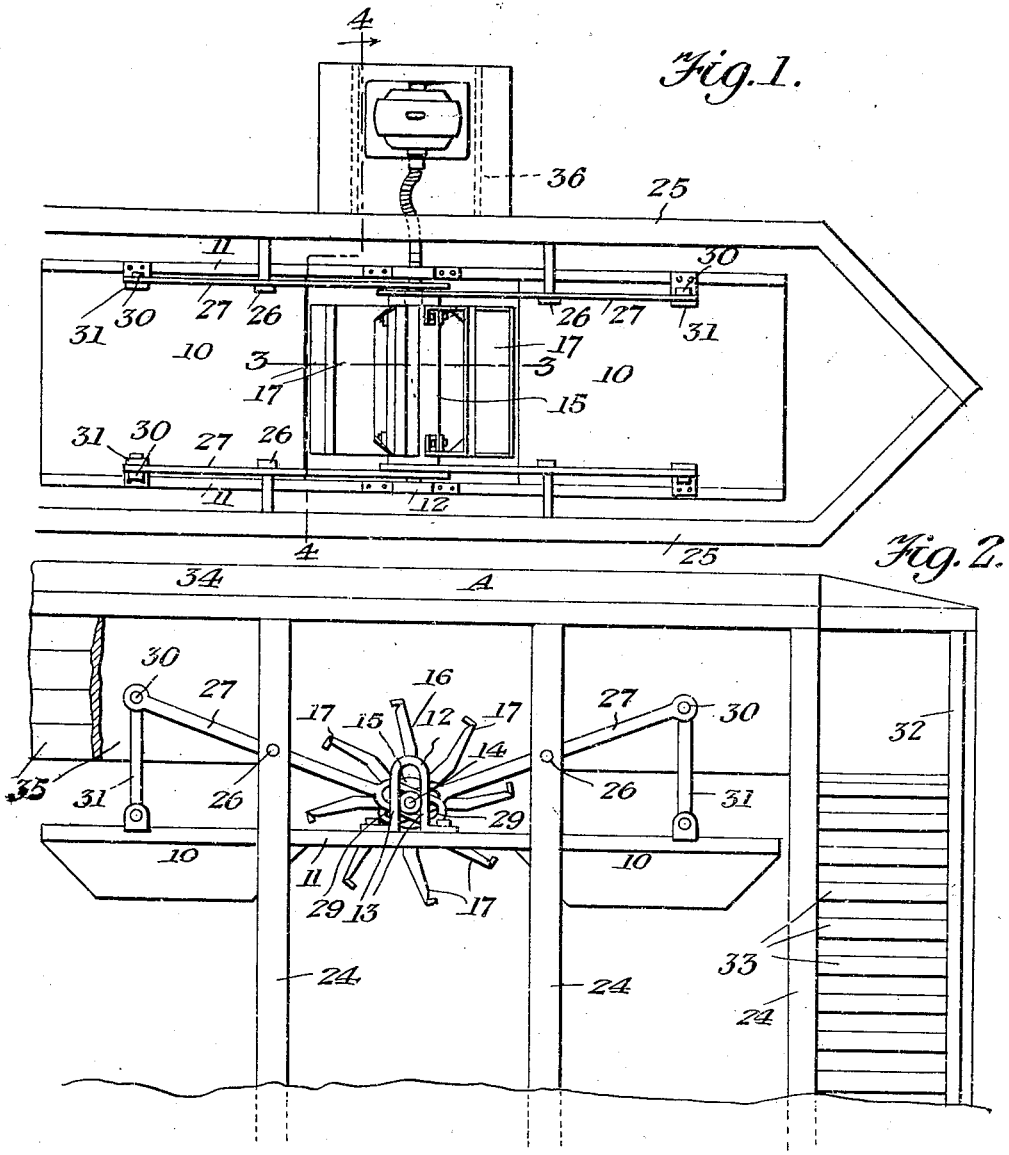
Witness
K. A. Thomas
Inventor
Rebecca A. Gipple
By Victor J. Evans
Attorney

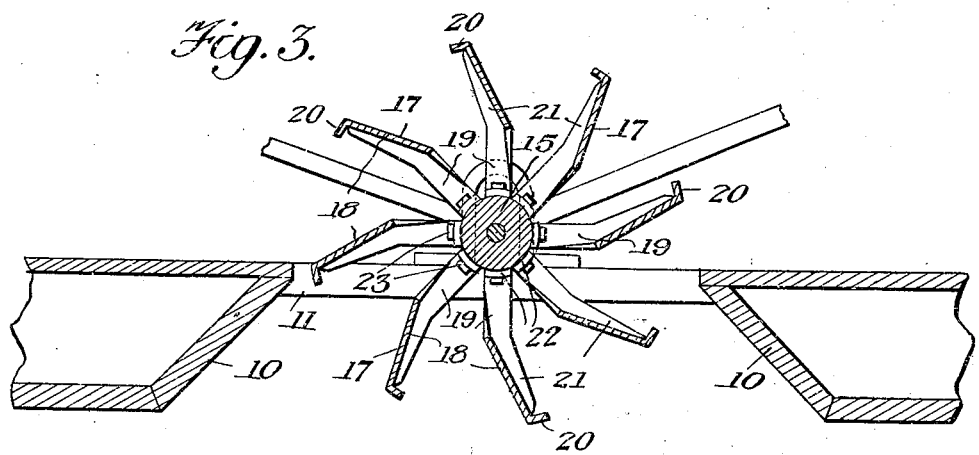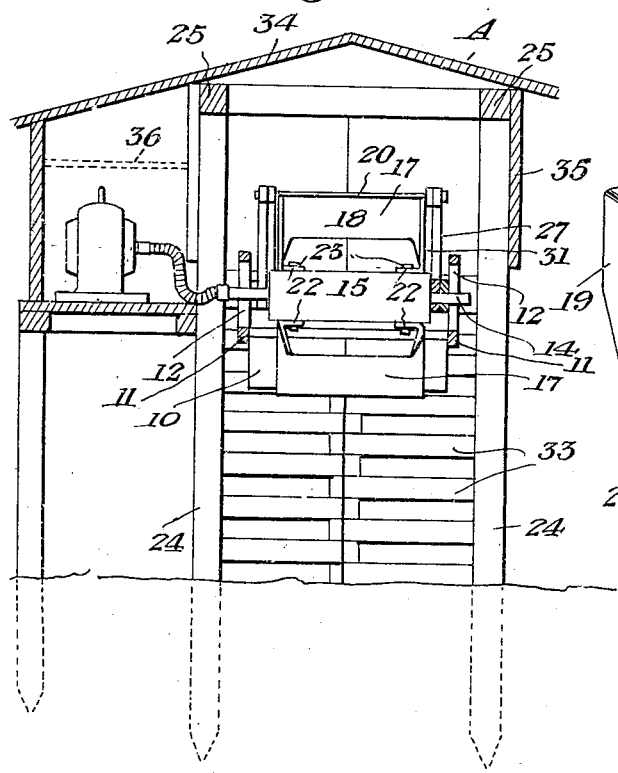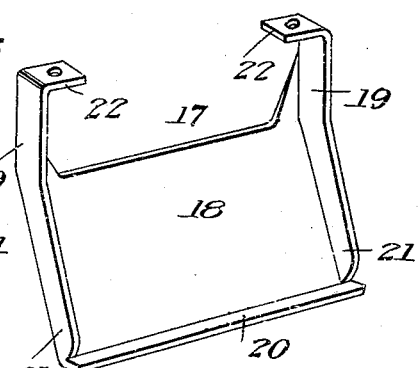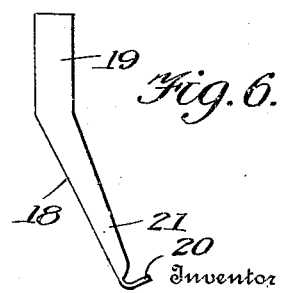

UNITED STATES PATENT OFFICE.

REBECCA A. GIPPLE, OF NEBRASKA CITY, NEBRASKA.

WATER-WHEEL.

1,316,440. Specification of Letters Patent. Patented Sept. 16, 1919.

Application filed September 14, 1918. Serial No. 255,133.

*To all whom it may concern:*

Be it known that I, REBECCA A. GIPPLE, a citizen of the United States, residing at Nebraska City, in the county of Otoe and State of Nebraska, have invented new and useful Improvements in Water-Wheels, of which the following is a specification.

This invention has reference to a current motor.

An object of the invention is to produce a device of this character wherein the motor wheel is so associated with the floats supporting the same that the undulated movement of the latter, incident to the rise and fall of the waves of the body of water in which the motor is arranged, influences the wheel in a vertical direction to cause the blades thereof to receive the full impact of force from such waves as well as from the current of the stream, and as a consequence insures a substantially uniform motion to the wheel.

A further object of the invention is to produce a current motor in which the blades of the motor wheel are of such construction as to offer full resistance to the waves or current to insure the proper turning of the wheel thereby but which also permits of the blades rising through the water with the least amount of resistance therefrom.

A further object of the invention is to mount the wheel of the motor on portable floats so that the device may be readily transferred to most advantageous points in a body of running water, if desired.

A further object of the invention is to provide means for protecting the floats and motor wheel from contact with objects floating down the stream so that injury thereto, in this respect, will be successfully overcome.

A further object of the invention is to produce a current motor comprising few simple parts, easily associated, strong and durable when so associated, and which will successfully and automatically perform the functions for which it is devised.

Other objects and advantages will appear as the nature of the invention is better understood, reference being had to the accompanying drawings, in which:

Figure 1 is a top plan view of a current motor constructed in accordance with this invention;

Fig. 2 is a side elevation of the same;

Fig. 3 is a sectional view approximately on the line 3—3 of Fig. 1;

Fig. 4 is a transverse sectional view approximately on the line 4—4 of Fig. 1;

Fig. 5 is a perspective view of one of the blades of the motor wheel; and

Fig. 6 is an end elevation of the same.

As disclosed by the drawings the floats for the current wheel are preferably in the nature of flat bottom boats which are designated by the numerals 10. Two of these boats are employed and are secured together, in spaced relation through the medium of beams 11 secured to the top of the sides thereof. The bow and stern of the boats 10 are arranged at opposite inclinations so that little resistance is offered to the waves or current passing thereunder.

On each of the beams 11 there is centrally arranged a vertically disposed upstanding guide member 12. The guide is preferably in the nature of a yoke, the parallel arms 13 of which being secured to the beams 11, and the connecting member for the arms being arched or rounded.

In the guides 13 are received trunnions 14 formed on the ends of the hub 15 of the current wheel 16.

The blades 17 of the current wheel are peculiarly constructed, each of the same being preferably stamped from a single sheet of suitable metal, as illustrated in Fig. 5 of the drawings. These blades may be made of any material most suitable or available in any size or length, of single pieces, or of connected pieces. The body 18 of each of the blades has its edges flanged to provide sides 19. The body and the flanges, at the upper portions of the blades are arranged straight, or at an angle with respect to the lower portion of the body and sides, the inclined portions of the sides being designated by the numerals 21. The lower edge of the body 18 is formed with an outturned lip 20. The portions 19 of the sides project a distance above the body, and the ends of the said portions 19 are inturned to provide flanges 22, the same having suitable openings through which pass securing elements, such as headed bolts 23 whereby the blades are secured to the hub 15 of the wheel. The sides 19 are arranged at a slight but suitable angle with respect to the body, whereby the flanges 21 on the outer edges of the said sides are disposed at nearly a right angle with respect to the body. The lips of the blades are all arranged in the same direction, when the said blades are secured upon the hub, and the space between the body and the ends of the sides forms an outlet for water between the blades and hub. The lips and flanges of the blades form the said blades with what may be termed buckets, so that a full impact of the current will be received therein. The water passes over the inner edges of the body in the space between the said bodies and the hub 15. As a consequence, a comparatively great impact of water is received by each of the blades but the construction of the blades permits of the same rising readily out of the water, the current acting on the lips of the rising blades materially assisting the same in their upward movement, and such contact of the current with the lips further influences the turning of the wheel.

To one of the trunnions 14 of the current wheel may be attached a suitable shaft, or as a matter of fact one or both of the trunnions may be in the nature of shafts, the latter may be connected to a dynamo for generating electric power or to any other device to which power is to be imparted by the current wheel.

The floats and current wheel are surrounded by a protective shield which also serves as an anchor therefor. This protector is in the nature of an open frame, being preferably constructed by driving piers 24 to the opposite sides of the floats and wheel, at a suitable distance therefrom, but parallel with the said sides. The piers 24 are preferably, but not necessarily connected at their upper ends by a top beam 25, and, of course, other suitable supporting and bracing beams may be arranged between the piers, if desired. Two pairs of oppositely disposed piers are arranged respectively adjacent to the stern of what may be termed the forward float 10 and the other pier adjacent to the bow of the rear float 10. To these referred to piers are pivotally secured, as at 26 levers 24. The inner ends of these levers are widened and the said widened portions are provided with elongated slots 29 which receive the shafts or trunnions 14 of the hub or the current wheel. The opposite or outer ends of the levers 27 have loosely connected thereto, as at 30 links 31, and these links are in turn loosely secured to the respective floats 10. By this arrangement it will be seen that the oscillatory movement of the floats in a vertical direction, or more strictly speaking the up and down movement imparted to the floats by the waves or current of the stream contacting therewith will raise and lower the current wheel. Thus when the boats are moved by such waves or current the wheel will be projected downwardly so that the full force of the current will be imparted against the blades of the wheel. The openings or slots 29 in the levers are of such proportions, however, that the downward movement of the floats on the body of water will not raise the wheel out of contact thereby. At the upper end of the protector shield, with respect to the flow of the current of the stream, a pier or post 32 is driven centrally between the end piers 24, but outwardly therefrom. To the pier 32 and to the referred to end piers 24 are secured lattice work constructed of beams 33 arranged horizontally, the beams to one side of the pier 32 being arranged between the beams to the opposite side of the said pier. This construction does not interfere with the free flowing of the stream and is not in the nature of a breakwater, but is designed to be contacted by floating bodies passing down the stream to direct the same to the opposite sides of the device so that such bodies will not interfere with the free and proper working of the current wheel. If desired, the nose of the protector shield, provided by the beams 33 may be constructed of metal and in a different manner to that above described.

The top of the shield, including the nose thereof may be provided with a suitable cover A, designated by the numeral 34. In addition to this, the sides of the shield may, at the upper portions thereof be likewise protected, which is particularly desirable in winter weather, such side protectors being indicated by the numeral 35. Also, the trunnion or shaft 14 connected to the power generating means, such as a dynamo or the like may be protected by a cylindrical covering, illustrated by the dotted lines in Fig. 1 of the drawings and indicated by the numeral 36, and through this cylinder warm air or steam may be directed from any suitable source. Any suitable means may be employed for braking the wheel when the mechanism, actuated thereby is to be halted or the motion thereof regulated.

It is believed, from the foregoing description, when taken in connection with the drawings, that the simplicity and advantages of the construction will be apparent to those skilled in the art to which such inventions appertain. It is also to be understood that while I have illustrated a satisfactory embodiment of the improvement as it now appears to me, the nature of the invention is such that the same is necessarily susceptible to various changes in size, proportion, etc., all of which, however, falling within the scope of what I claim.

Having thus described the invention, what is claimed as new, is:—

1. In a current motor, a paddle wheel having trunnions on the ends of the hub thereof, floats disposed to the opposite sides of the wheel, vertically disposed guide yokes supported by the floats and receiving the trunnions of the wheel, and a skeleton protector frame, including an angle nose surrounding the wheel and floats.

2. In a current motor, a paddle wheel having trunnions on the ends of the hub thereof, floats having inwardly inclined ends disposed to the opposite sides of the wheel, connecting means for said floats, vertically disposed guide yokes on the said means and receiving therein the trunnions of the wheel, and a skeleton protector frame including an angle nose surrounding the wheel and floats.

3. In a current motor, a paddle wheel, floats disposed to the opposite sides of said wheel, connecting means for said floats, guide means for the paddle wheel, on said connecting means, means actuated by the floats when the latter are influenced by the current for directing the wheel toward the stream, and a skeleton protector frame including an angle nose surrounding the wheel and floats.

4. In a current motor, a paddle wheel including a hub having angularly disposed blades secured thereto, each of said blades comprising a body portion and sides depending from the body portion and connected to the hub, angle lips on the outer edge of each of the said body portions, floats to the opposite sides of the wheel, connecting means between the floats, guide means for the wheel carried by said supporting means, and a skeleton protector frame, including an angle nose surrounding the wheel and floats.

5. In a current motor, two flat boats having inclined bows and sterns, beams secured to the upper sides of the boats spacing the latter, substantially U-shaped guides arranged centrally of said beams, a current wheel having trunnions received in said guides, means on said trunnions influenced by the rise and fall of the boats for directing the wheel to the stream, and a protector skeleton frame surrounding the wheel and boats and including an angle nose portion.

6. In a current motor, floats, connecting means therebetween, guides projecting from said connecting means, a current wheel having trunnions received in said guides, a skeleton protective frame including an angle nose surrounding said floats and wheel, levers pivotally secured to said frame and having slotted inner ends receiving the trunnions, and links loosely secured to the outer ends of said levers and loosely connected to the respective floats.

7. A blade for a current wheel formed from a sheet of material, shaped to include a body, sides on the body and an angle lip on the lower edge of the body, said sides having their outer portions arranged angularly with respect to their inner portions and the said inner portions projecting beyond the body of the blade and having their ends inturned to provide flanges.

In testimony whereof I affix my signature.

REBECCA A. GIPPLE.

Copies of this patent may be obtained for five cents each, by addressing the "Commissioner of Patents, Washington, D. C."